United States Patent
Rewald

(10) Patent No.: US 10,593,498 B1
(45) Date of Patent: Mar. 17, 2020

(54) CIRCUIT FOR REDUCING THE POWER CONSUMPTION WHEN DRIVING A RELAY

(71) Applicant: WAGO Verwaltungsgesellschaft mbH, Minden (DE)

(72) Inventor: Jan Rewald, Minden (DE)

(73) Assignee: WAGO Verwaltungsgesellschaft mbH, Minden (DE)

(*) Notice: Subject to any disclaimer, the term of this patent is extended or adjusted under 35 U.S.C. 154(b) by 0 days.

(21) Appl. No.: 16/390,707

(22) Filed: Apr. 22, 2019

(30) Foreign Application Priority Data

Oct. 16, 2018 (DE) .................. 20 2018 105 908 U

(51) Int. Cl.
| | | |
|---|---|---|
| *H02M 1/10* | (2006.01) | |
| *H01H 47/04* | (2006.01) | |
| *H02M 3/156* | (2006.01) | |
| *H02M 3/07* | (2006.01) | |

(52) U.S. Cl.
CPC .............. *H01H 47/04* (2013.01); *H02M 1/10* (2013.01); *H02M 3/07* (2013.01); *H02M 3/156* (2013.01)

(58) Field of Classification Search
CPC .......... H01H 47/04; H02M 3/07; H02M 1/10; H02M 3/156
USPC ......................................................... 327/540
See application file for complete search history.

(56) References Cited

U.S. PATENT DOCUMENTS

| | | | | |
|---|---|---|---|---|
| 7,268,994 B2* | 9/2007 | Kondo | ................. | H01H 47/002 361/160 |
| 2008/0284557 A1* | 11/2008 | Ueno | ................. | H01H 85/0417 337/251 |
| 2012/0261207 A1* | 10/2012 | Kawanaka | ........... | B62D 5/0484 180/404 |
| 2014/0049114 A1* | 2/2014 | Chen | ...................... | H01H 47/22 307/75 |
| 2014/0077743 A1* | 3/2014 | Son | ......................... | B60L 50/20 318/494 |
| 2014/0268456 A1* | 9/2014 | Mochizuki | ............... | H02H 9/04 361/84 |
| 2015/0280410 A1* | 10/2015 | Elberbaum | .............. | H02G 3/18 361/679.01 |

(Continued)

FOREIGN PATENT DOCUMENTS

| | | |
|---|---|---|
| DE | 3305674 A1 | 8/1984 |
| DE | 19638260 A1 | 11/1997 |

(Continued)

*Primary Examiner* — Ryan Jager
(74) *Attorney, Agent, or Firm* — Muncy, Geissler, Olds & Lowe, P.C.

(57) ABSTRACT

A circuit for reducing a power consumption when driving a relay, the circuit includes a first input, a second input, a timing element, a longitudinal control having a Zener diode and a transistor, a first output, and a second output. The first and second inputs are configured to input an input voltage and the first and second outputs are configured for outputting an output voltage for driving the relay. The Zener diode is configured, when the input voltage exceeds a breakdown voltage of the Zener diode, to generate a voltage source, which is connected to the control input of the transistor via a diode and to provide a control voltage that is stabilized and reduced in level compared with the input voltage. The control input is connected to the first input via a timing element.

13 Claims, 4 Drawing Sheets

(56) References Cited

U.S. PATENT DOCUMENTS

| | | | | |
|---|---|---|---|---|
| 2016/0105015 A1* | 4/2016 | Wang | ..................... | H02H 3/162 361/42 |
| 2018/0288842 A1* | 10/2018 | Ding | .................. | H05B 33/0809 |
| 2018/0301305 A1* | 10/2018 | Schaar | ................... | H01H 47/04 |

FOREIGN PATENT DOCUMENTS

| | | |
|---|---|---|
| DE | 10022342 A1 | 11/2001 |
| DE | 10158318 A1 | 6/2003 |
| DE | 102015117593 A1 | 4/2017 |
| JP | 2015095432 A | 5/2015 |

\* cited by examiner

CIRCUIT FOR REDUCING THE POWER CONSUMPTION WHEN DRIVING A RELAY

This nonprovisional application claims priority under 35 U.S.C. § 119(a) to German Patent Application No. 20 2018 105 908.4, which was filed in Germany on Oct. 16, 2018, and which is herein incorporated by reference.

BACKGROUND OF THE INVENTION

Field of the Invention

The present invention relates to a circuit for reducing the power consumption when driving a relay. In particular, the present invention relates to a circuit which can generate a switching current for initiating a switching operation and reduces it to a holding current after switching.

Description of the Background Art

Relays often still require a holding current that is significantly reduced compared with the switching current after the switching operation to maintain the switch position. A resulting method for reducing the power consumption therefore includes reducing the switching current flowing through the relay switch input after switching.

SUMMARY OF THE INVENTION

It is therefore an object of the present invention to further the conventional art, as circuits of the invention enable a reduction of an input voltage to a stabilized output voltage by means of a longitudinal control and a timing element. As a result, the output voltage can be reduced much more aggressively than in the case of an unstabilized output voltage.

In an exemplary embodiment, a circuit of the invention comprises a first input, a second input, a timing element, a longitudinal control having a Zener diode and a transistor, a first output, and a second output. The inputs are configured for inputting an input voltage and the outputs for outputting an output voltage for driving the relay. The Zener diode is configured, when the input voltage exceeds the breakdown voltage of the Zener diode, to generate a voltage source which is connected via a diode to the control input of the transistor and provides a control voltage (holding voltage) that is stabilized and reduced in level compared with the input voltage. The control input is connected to the first input via the timing element, whereby, when the input voltage exceeds the breakdown voltage of the Zener diode, a transient increase in the control voltage present at the control input is effected, which exceeds the control voltage provided by the voltage source.

In this case, the term "timing element," can be used in the description and claims, is to be understood in particular to be a capacitor connected in series to a resistor. Further, the term "longitudinal control," can be used in the description and claims, is understood to be an assembly comprising a Zener diode and a transistor, the Zener diode providing a stabilized control voltage for controlling the transistor. Further, the term "relay," can be used in the description and claims, is to be understood in particular to be an assembly with a switch that can be controlled by a magnetic field and can be opened or closed by controlling a current through a coil.

Further, the term "voltage source," can be used in the description and claims, is to be understood to be an assembly that outputs (in operation) a (substantially) constant voltage independent of the current supplied. Furthermore, the expression "control input of a transistor", can be used in the description and claims, is to be understood in particular to be the base of the transistor. In addition, the term "control voltage that is stabilized and reduced in level," can be used in the description and claims, is to be understood to be in particular a lower voltage having smaller variations than the input voltage.

The timing element can comprise a capacitor and the transient increase is limited by a decrease in the current flowing through the capacitor.

The Zener diode and a series resistor can be arranged in series to one another between the first input and the second input.

The diode blocks a current flow from the control input to the second input.

The transistor can be formed as an NPN transistor and the first output is connected to the emitter of the transistor.

A relay coil of the relay can be connected to the outputs.

The first input can be at a higher potential than the second input.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
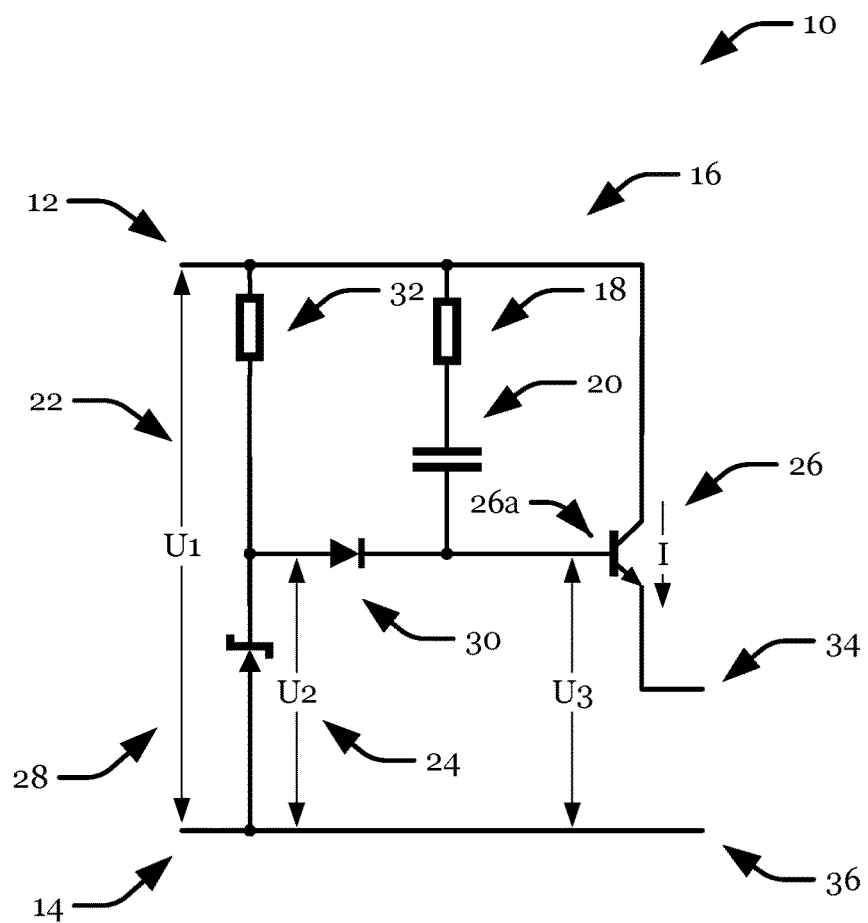
FIG. 1 shows a circuit for reducing the power consumption when driving a relay, according to an embodiment.
Figure 1:
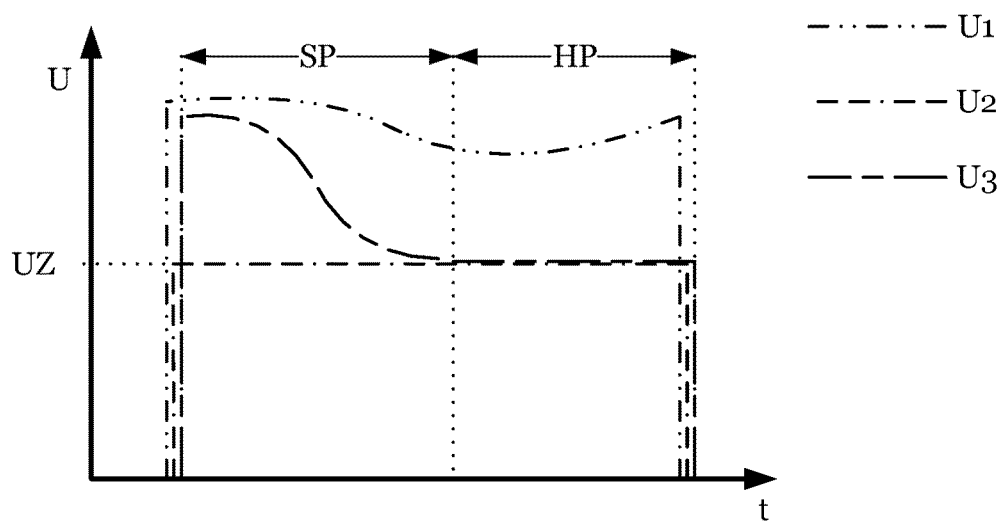

The same or functionally similar elements are identified by the same reference characters in the drawings.

FIG. 1 shows a circuit 10 for reducing the power consumption when driving a relay. Circuit 10 includes a first input 12 and a second input 14 to which a (substantially) constant voltage is applied during operation, which is output, for example, by a control module. The control module is configured to close the relay (normally open relay) by outputting a first voltage and to open it by outputting a second voltage lower than the first voltage. However, the invention is not limited to the control of a normally open relay, but can also be used to control a normally closed relay.

Circuit 10 comprises a timing element 16 having a resistor 18 and a capacitor 20, and a longitudinal control 22 having a Zener diode 24 and a transistor 26. If the input voltage U1 present at inputs 12, 14 exceeds the breakdown voltage UZ of Zener diode 24, the Zener diode generates a voltage source 28 which is connected to control input 26a of transistor 26 via a diode 30 and provides a control voltage U2 that is stabilized and reduced in level compared with the input voltage U1.

Control input 26a is also connected to first input 12 via timing element 16, whereby, when the input voltage U1 exceeds the breakdown voltage UZ of Zener diode 24, a transient increase of the control voltage U3 present at control input 26a is effected, which exceeds the control voltage U2 provided by voltage source 28. As a result, the current flow I through transistor 26 in a switching phase SP is increased compared with a holding phase HP following the switching phase SP.

Diode 30 located between voltage source 28 and control input 26a of transistor 26 prevents the outflow of the current, causing the increase, via the Zener diode to second input 14. The transient increase is limited by the decrease in the current flowing through capacitor 20, because the current flowing through control input 26a in transistor 26 can only be maintained by the current flowing through series resistor 32 of Zener diode 24 and diode 30.

Figure 1A:
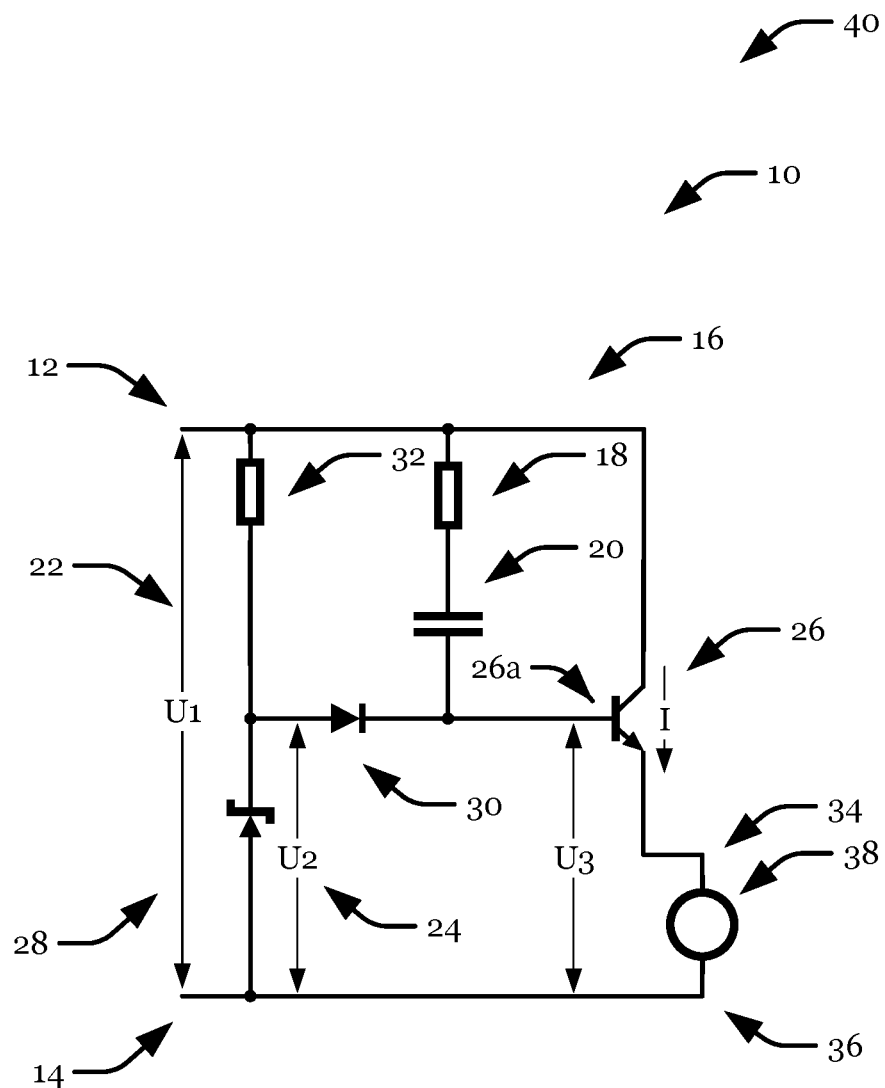
FIG. 1a shows the circuit for reducing the power consumption when driving a relay, according to the embodiment.

As shown in FIG. 1a, as a result, during the switching phase SP between first output 34 and second output 36 immediately after the application of an input voltage U1, which exceeds the breakdown voltage UZ of Zener diode 24, a switching current I flows through relay coil 38 of device 40, which enables an opening of the relay. In the holding phase HP following the switching phase SP, a holding current I then flows through relay coil 38, which would not enable a switching of the relay but is sufficient to keep the relay open.

Figure 2:
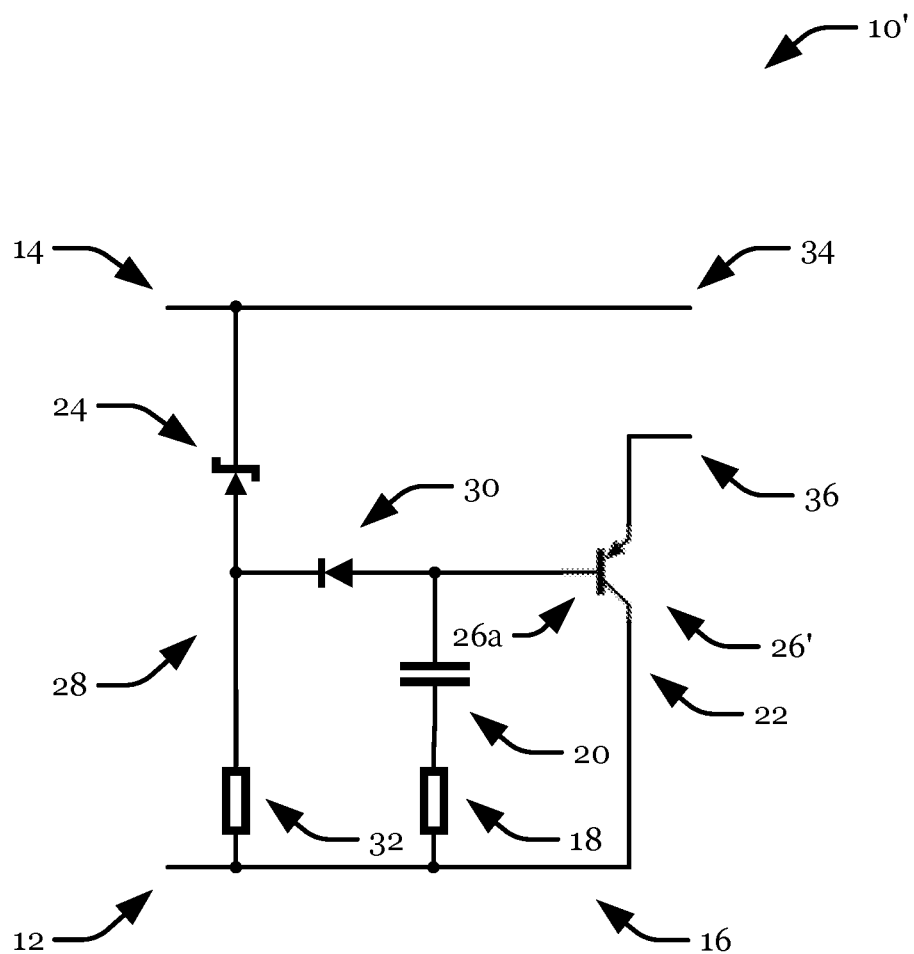
FIG. 2 shows a circuit for reducing the power consumption when driving a relay, according to an embodiment.
Figure 3:
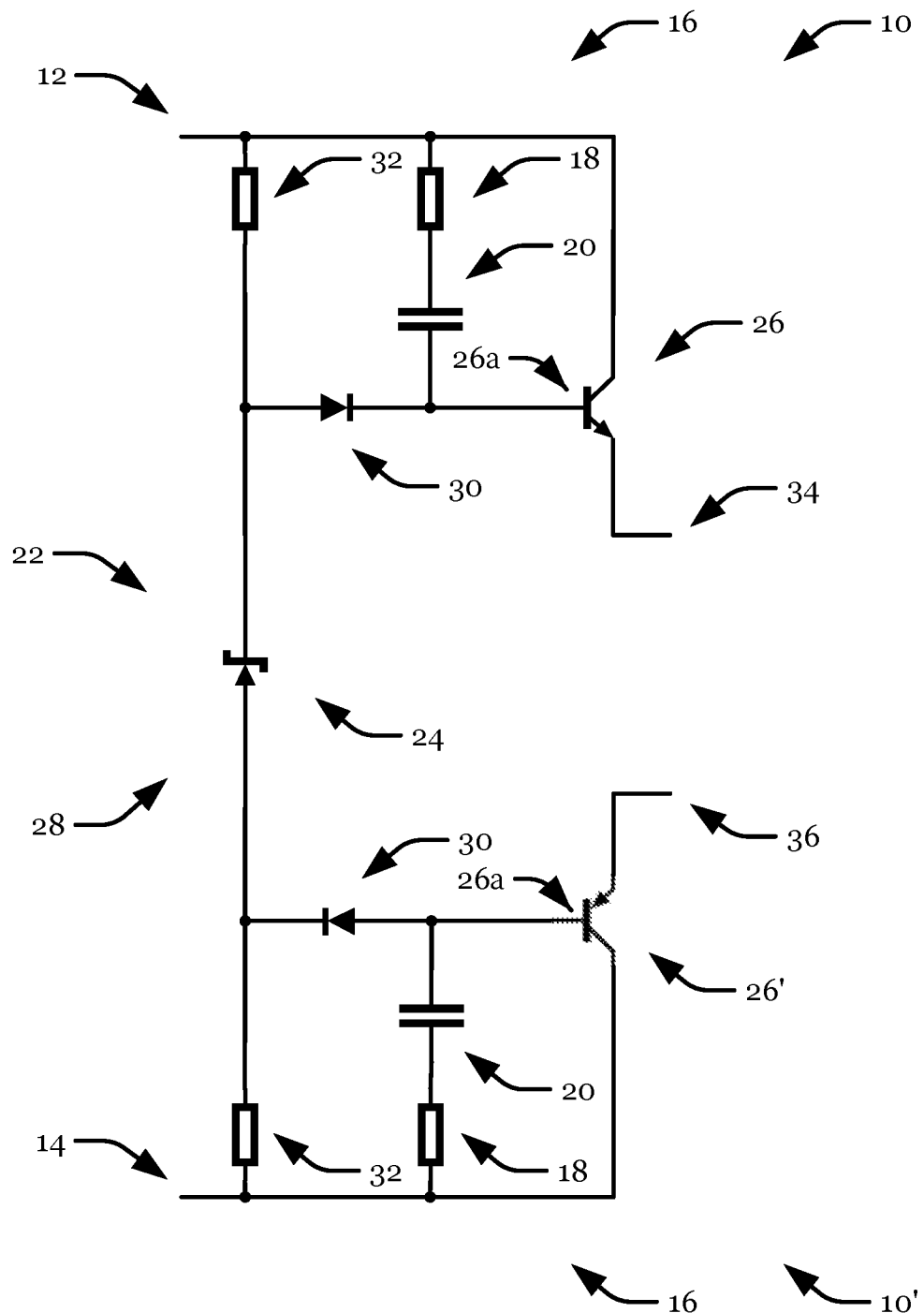
FIG. 3 shows a circuit for reducing the power consumption when driving a relay, according to an embodiment.

As shown in FIG. 2, circuit 10 shown in FIG. 1 can also be implemented inverted, wherein in circuit 10' shown in FIG. 2, a PNP transistor 26' can be instead of an NPN transistor 26, and the higher potential is present at second input 14 instead of first input 12, as shown in FIG. 1. As shown in FIG. 3, circuits 10, 10' shown in FIGS. 1 and 2 can also be combined.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A circuit for reducing a power consumption when driving a relay, the circuit comprising:
    a first input;
    a second input;
    a timing element;
    a longitudinal control having a Zener diode and a transistor having an output;
    a first output; and
    a second output;
    wherein one of the first output and the second output is connected to the output of the transistor,
    wherein the first and second inputs are configured to receive an input voltage between the first input and the second input and the first and second outputs are configured for outputting an output voltage between the first output and the second output for driving the relay when inputs of the relay are connected to the first and second outputs;
    wherein the Zener diode is configured, when the input voltage between the first input and the second input exceeds a breakdown voltage of the Zener diode, to generate a voltage source, which is connected to a control input of the transistor via a diode and to provide a control voltage across the Zener diode that is stabilized and reduced in level compared with the input voltage between the first input and the second input,
    wherein the control input of the transistor is connected to the first input via the timing element, and
    wherein, when the input voltage between the first input and the second input exceeds the breakdown voltage of the Zener diode, a transient increase in a control voltage present at the control input is effected, which exceeds the control voltage across the Zener diode supplied by the voltage source.

2. The circuit according to claim 1, wherein the timing element comprises a capacitor in between the first input and the control input of the transistor, and
    wherein the transient increase is limited by a decrease in a current flowing through the capacitor.

3. The circuit according to claim 1, wherein the Zener diode and a series resistor are arranged in series to one another between the first input and the second input.

4. The circuit according to claim 1, further comprising:
    a diode between the control input of the transistor and the second input,
    wherein the diode blocks a current flow from the control input to the second input.

5. The circuit according to claim 1, wherein the transistor is formed as an NPN transistor and the first output is connected to an emitter of the transistor.

6. A device comprising:
    a circuit according to claim 1; and
    the relay, wherein a relay coil of the relay is connected to the first and second outputs.

7. The device according to claim 6, wherein the first input is at a higher potential than the second input.

8. A circuit for driving a relay, the circuit comprising:
    a first input and a second input configured to receive an input voltage therebetween;
    a Zener diode;
    a resistor in series connection with the Zener diode such that a first end of the resistor is electrically connected to the first input, a second end of the resistor is electrically connected to the first end of the Zener diode, and a second end of the Zener diode is electrically connected to the second input;
    a transistor comprising:
        an emitter;
        a collector electrically connected to the first input; and
        a base electrically connected to the first end of the Zener diode;
    a capacitor having a first end electrically connected to the first input and a second end electrically connected to the first end of the Zener diode and to the base of the transistor; and
    a first output and a second output configured to drive the relay when the relay is electrically connected to the circuit, one of the first output and the second output being electrically connected to the emitter of the transistor,
    wherein the Zener diode is configured such that when the input voltage between the first input and the second input exceeds a breakdown voltage of the Zener diode, the Zener diode outputs a source voltage across the Zener diode, and
    wherein the capacitor is configured such that when the input voltage between the first input and the second input exceeds the breakdown voltage of the Zener diode, a control voltage present at the base of the transistor transitions from a voltage above the source voltage to the source voltage.

9. The circuit of claim 8, further comprising:
a diode between the base of the transistor and the first end of the Zener diode such that a current flow from the base of the transistor to the Zener diode is blocked.

10. The circuit of claim 8, wherein the transistor is an NPN transistor, and
wherein the first output is electrically connected to the emitter of the transistor and the second output is electrically connected to the second input.

11. The circuit of claim 8, wherein the transistor is a PNP transistor, and
wherein the first output is electrically connected to the first input and the second output is electrically connected to the emitter of the transistor.

12. A circuit for driving a relay, the circuit comprising:
a first input and a second input configured to receive an input voltage therebetween;
a first output and a second output configured to drive the relay when the relay is electrically connected to the circuit;
a first resistor, a Zener diode, and a second resistor in series connection such that a first end of the first resistor is electrically connected to the first input, a second end of the first resistor is electrically connected to the first end of the Zener diode, a second end of the Zener diode is electrically connected to the first end of the second resistor, and a second end of the second resistor is electrically connected to the second input;
an NPN transistor comprising:
a collector electrically connected to the first input;
a base electrically connected to first end of the Zener diode; and
an emitter electrically connected to the first output;
a first capacitor having a first end electrically connected to the first input and a second end electrically connected to the first end of the Zener diode and to the base of the NPN transistor;
a PNP transistor comprising:
a collector electrically connected to the second input;
a base electrically connected to second end of the Zener diode; and
an emitter electrically connected to the second output; and
a second capacitor having a first end electrically connected to the second input and a second end electrically connected to the second end of the Zener diode and to the base of the PNP transistor.

13. The circuit of claim 12, further comprising:
a first diode between the base of the NPN transistor and the first end of the Zener diode such that a current flow from the base of the NPN transistor to the Zener diode is blocked; and
a second diode between the second end of the Zener diode and the base of the PNP transistor such that a current flow from the Zener diode to the base of the PNP transistor is blocked.

\* \* \* \* \*